June 13, 1961 H. E. MORTON 2,987,969
RAM-MOUNTED QUICK-DETACHABLE MACHINING APPARATUS
Filed May 22, 1956 5 Sheets-Sheet 4
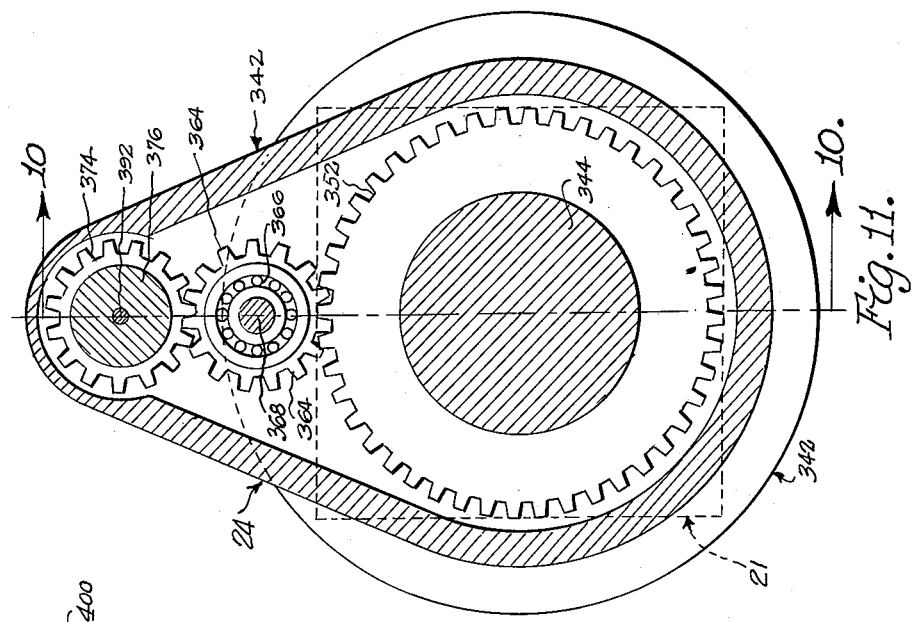
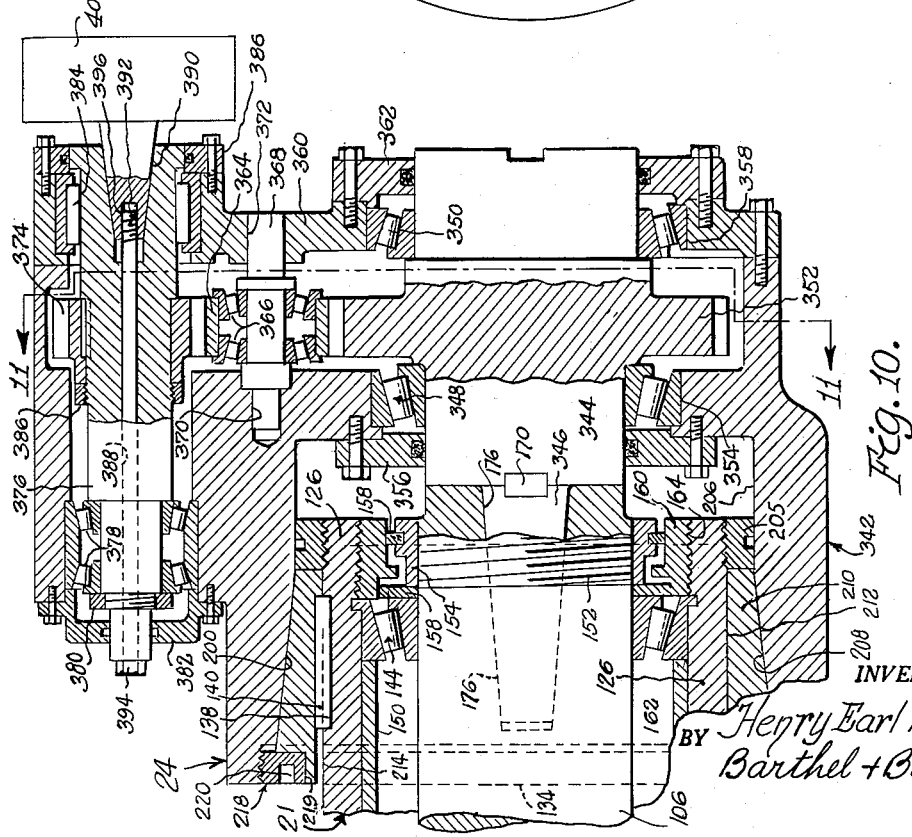
INVENTOR.
*Henry Earl Morton*
BY *Barthel + Bugbee*
*Attys*

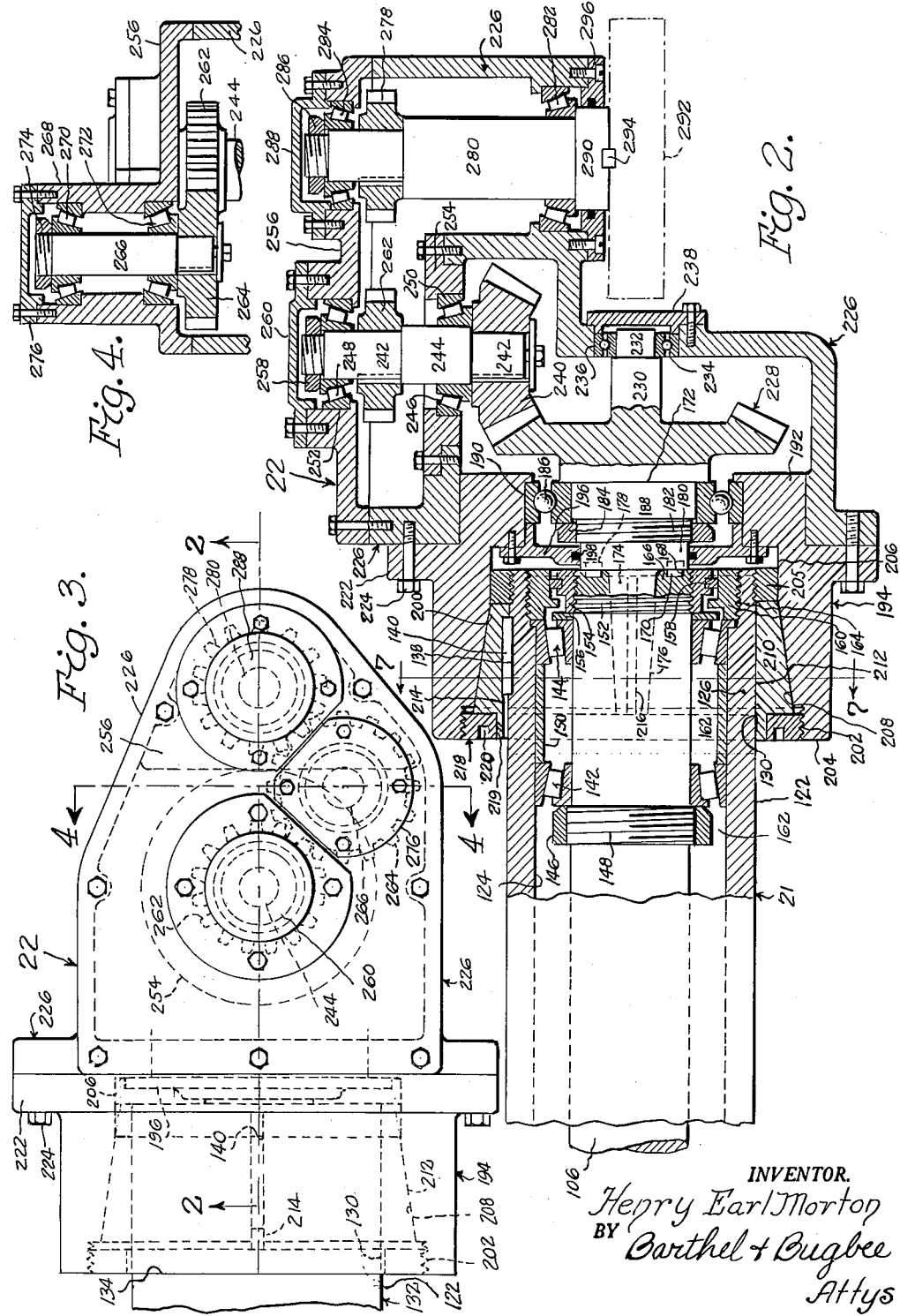

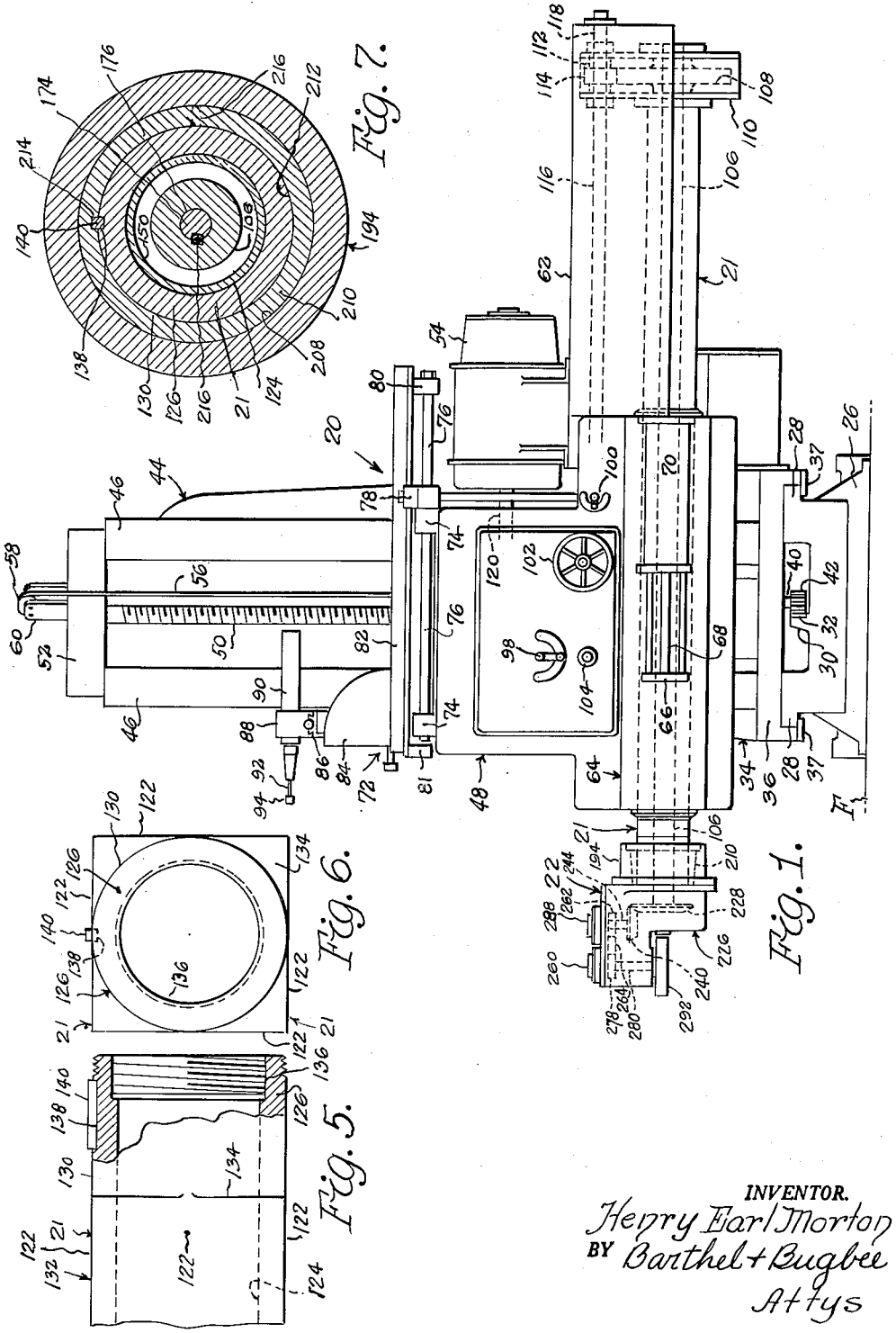

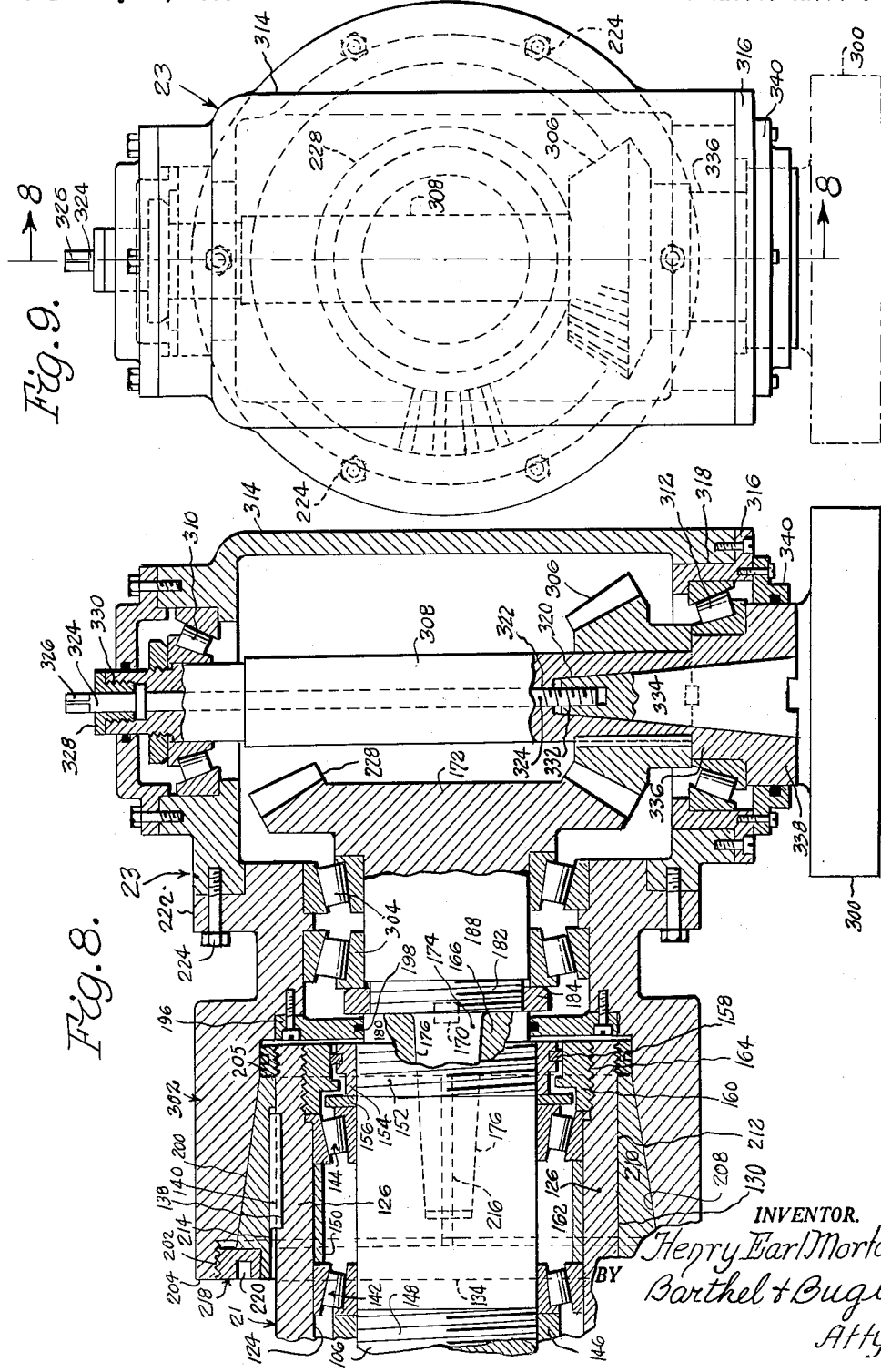

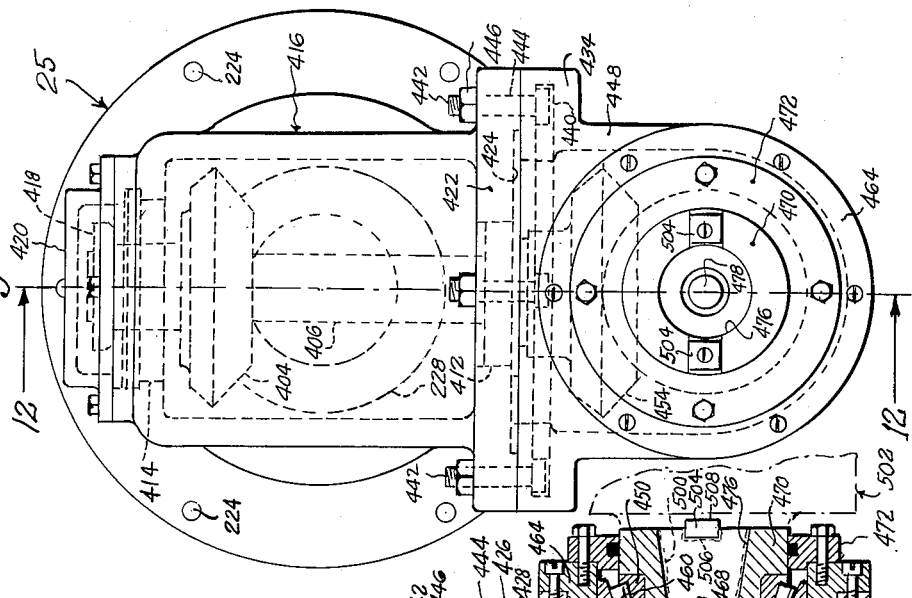

United States Patent Office 2,987,969
Patented June 13, 1961

2,987,969
RAM-MOUNTED QUICK-DETACHABLE
MACHINING APPARATUS
Henry Earl Morton, Hoyt and Broadway Sts.,
Muskegon, Mich.
Filed May 22, 1956, Ser. No. 586,478
5 Claims. (Cl. 90—11)

This invention relates to machine tools and, in particular, to ram-mounted machining apparatus for milling machines.

One object of this invention is to provide a ram-mounted quick-detachable machining apparatus for traveling ram milling machines, wherein the apparatus is mounted on and travels with a reciprocating ram of rectangular or other polygonal cross-section forming a part of the milling machine and which is quickly attached to and detached from the ram in order to adapt the machine to a widely differing variety of tasks.

Another object is to provide a machining apparatus of the foregoing character having a head which is adjustable around the axis of the driving shaft within the ram so as to position the machining tool thereof at various positions relatively to the ram.

Another object is to provide a machining apparatus of the foregoing character wherein the machining tool head is of compact yet universally adjustable construction so that it may extend into restricted space within the interior of workpieces, such as large dies, to machine the internal surfaces of such workpieces precisely and quickly.

Another object is to provide a machining apparatus of the foregoing character wherein the ram-mounted head is of exceptionally rigid construction so that heavier feeds and speeds may be employed than has hitherto been possible, while maintaining exceptionally high standards of accuracy not hitherto attainable at such feeds and speeds, even though the surface being machined is located a long distance from the main support of the machine.

Another object is to provide a machining apparatus of the foregoing character wherein the ram-mounted head is provided with an offset right-angle spindle carrying a cutter which may be substantially centered with the axis of rotation of the driving shaft within the ram, whereby the head can be rotated and secured in angle of position around the ram spindle axis of rotation so as to operate either in a horizontal plane or in a vertical plane.

Another object is to provide a machining apparatus as set forth in the object immediately preceding, wherein the cutter is offset transversely to the axis of rotation of the driving shaft of the ram, thereby further extending the range of the apparatus.

Another object is to provide a machining apparatus, as set forth in the preceding objects, wherein the cutting tool spindle is disposed in the head of a transversely displaced position relatively to the axis of rotation of the driving shaft within the ram but rotates upon an axis parallel thereto and may be adjusted in a circular orbit around the ram shaft axis of rotation while remaining in parallelism therewith.

Another object is to provide a machining apparatus as set forth in the object immediately preceding, wherein the cutting tool shaft is rotatably mounted in a subhead which is itself adjustably rotatable relatively to the main head around an axis perpendicular to the axis of the ram drive shaft while the main head retains the capability of adjustable rotation around the axis of the ram drive shaft, thereby enabling the axis of rotation of the cutting tool shaft to be placed in transversely-spaced relationship either parallel to the ram drive shaft or at any desired angle around an axis which is itself perpendicular to the ram drive shaft axis.

Another object is to provide a machining apparatus as set forth in the preceding objects, which is especially well adapted for applications to such machines wherein the ram is moved horizontally in response to tracer control, preferably by hydraulic means, from a master pattern or template, in order to machine the interior or relatively inaccessible external portions of large workpieces such as large automobile body dies, roof dies, fender dies, and the like, at high feeds and rapid cutting speeds, in contrast to the slow feeds and cutting speeds with end mill cutters used in prior machines because of the lack of rigidity thereof.

Another object is to provide a machining apparatus of the foregoing character, the head of which may be quickly and easily adjusted from one angle to another to adapt it to the machining of surfaces on the workpiece at different angles relatively to the ram drive shaft axis, thereby eliminating the slow and expensive repositioning of the workpiece relatively to the machine hitherto employed and resulting in a large proportionate time of idleness of the machine with consequently high costs of operation.

Other objects and advantages of the invention will become apparent during the course of the following description of the accompanying drawings, wherein:

FIGURE 1 is a front elevation of a traveling ram milling machine equipped with a ram-mounted quick-detachable machining apparatus according to one form of the invention, wherein the cutting tool is centered on the axis of rotation of the ram drive shaft but rotates upon a spindle perpendicular thereto;

FIGURE 2 is an enlarged vertical section, partly in rear elevation, of the quick-detachable machining apparatus shown in FIGURE 1, taken along the line 2—2 in FIGURE 3;

FIGURE 3 is a top plan view of the machining apparatus shown in FIGURE 2;

FIGURE 4 is a transverse fragmentary vertical section taken along the line 4—4 in FIGURE 3 at right angles to FIGURE 2;

FIGURE 5 is a fragmentary side elevation, partly in central vertical section, of the forward end of the ram shown in FIGURE 2 but removed from the machine;

FIGURE 6 is a right-hand elevation of the ram shown in FIGURE 5;

FIGURE 7 is a cross-section taken along the line 7—7 in FIGURE 2;

FIGURE 8 is a section similar to FIGURE 2, taken along the line 8—8 in FIGURE 9, but of a slight modification wherein the cutting tool is transversely offset from the axis of rotation of the ram drive shaft;

FIGURE 9 is a right-hand end elevation of the apparatus shown in FIGURE 8, with certain of the gearing shown in dotted lines;

FIGURE 10 is a view similar to FIGURE 2, taken along the line 10—10 in FIGURE 11, but of a further modification wherein the cutting tool spindle is mounted upon an axis parallel to the axis of rotation of the ram drive shaft but is adjustable in a circular orbit therearound.

FIGURE 11 is a cross-section taken along the line 11—11 in FIGURE 10;

FIGURE 12 is a section similar to FIGURE 2 taken along the line 12—12 in FIGURE 13, but of a still further modification wherein the cutting tool shaft is mounted on an axis of rotation displaced transversely to the axis of rotation of the ram drive shaft and adjustable not only in a circular orbit therearound but also additionally adjustable in a circular orbit around an axis perpendicular to the ram drive shaft axis; and FIGURE 13 is a right-hand end elevation of the still further modified machining apparatus shown in FIGURE 12.

General arrangement

Hitherto, great difficulty has been experienced in machining internal or other almost inaccessible surfaces in large workpieces such as automobile body dies. Such dies, used in large presses for forming body panels, roofs or fenders of automobiles, require the insertion of hardened steel blocks and these in turn require the machining of small surfaces which are not only relatively inaccessible but are located at comparatively long distances from the entrance to the interior of the workpiece, hence at long distances from the supporting structure of a milling machine intended to mill such surfaces for reception of such hardened steel blocks.

Moreover, such body dies and similar large workpieces of this character have such surfaces to be machined located at angles to one another as well as spaced apart from one another, with the result that hitherto it has been necessary to to reposition the workpiece after each such surface has been machined. This requires that the workpiece be tilted on taper fixtures or reset in order to successively permit machining of these angular or tapered surfaces, with the result that much of the time is occupied in setting up and repositioning the workpiece to make these successive cuts at varying angles relatively to one another, so that the machining itself is actually performing cutting operations only a very small proportion of the time. The cost of idleness resulting from this situation is a large factor in the extremely high cost of such dies, a cost which is inevitably reflected in a higher cost to the ultimate purchaser of the automobile. Furthermore, due to the great distances between the supporting structure of the round-spindled horizontal boring machine usually used and the surface being machined, sufficient rigidity could not be obtained to use normal cutting feeds and speeds, with the result that the costs were increased to a still greater extent by the slowness of cutting operations.

The present invention provides a reciprocating ram of square or rectangular cross-section mounted on a vertically-movable carriage on a support which travels horizontally at right angles to the direction of travel of the ram, which is provided with quick-detachable machining heads capable of adjustment in various directions without requiring repositioning of the work, and forming with the ram of rectangular cross-section an exceptionally rigid and unyielding structure enabling milling to take place at much higher feeds and cutting speeds than has been possible with prior machines, and at the same time eliminating or minimizing the repositioning of the workpiece between the machining of successive surfaces.

The different heads provided for different milling conditions are readily attached to and detached from the ram or quickly and easily adjusted relatively to the axis of the ram, with the result that machining of the successive surfaces of the workpiece is accomplished rapidly and concisely with a minimum of idleness time involved in the operation of the machine. This in turn results in large savings in labor and overhead, savings which result in a lower price to the ultimate buyer of the automobile or other article, the parts of which are produced by such workpieces. The various heads and their actions are specifically set forth above in the objects of the invention and are interchangeable with one another on the end of the ram, which is of special configuration to enable the quick interchange and adjustment thereof, as set forth in more detail below.

The present invention is particularly well adapted for use in so-called "Kellering" operations where the ram is moved under so-called tracer control, preferably by a hydraulic piston and cylinder in response to the configuration of a master pattern or template which is reproduced in or on the workpiece. FIGURE 1 of the present drawings shows one such machine with its tracer element but without the template, the machine being equipped with the ram and one of the quick-detachable adjustable machining heads of the present invention.

Horizontal ram milling machine construction

Referring to the drawings in detail, FIGURE 1 shows in front elevation a horizontal ram traveling head milling machine equipped with tracer control and generally designated 20, provided with a reciprocating ram 21 and one of several interchangeable quick-detachable machining heads 22, 23, 24 and 25 of the present invention. A set of these heads 22, 23, 24 and 25, together with the ram 21 to which they are separably and interchangeably attached comprises the machining apparatus of the present invention. The construction of the remainder of the machine 20 is conventional and hence requires only a brief description since it is well known to those skilled in the machine tool art and its details, other than as set forth above, are beyond the scope of the present invention. The machining head 22 is shown in FIGURES 1 to 7 inclusive, 23 in FIGURES 8 and 9, 24 in FIGURES 10 and 11, and 25 in FIGURES 12 and 13.

The milling machine 20 consists of an elongated rectangular base 26 (FIGURE 1) adapted to be bolted or otherwise secured to the floor F and having horizontal ways 28 and a rack support 30 carrying a rack 32 disposed between the ways 28. Reciprocably mounted for travel back and forth along the ways 28 is a pedestal carriage, generally designated 34, the base portion 36 of which is configured to engage the ways 28 and is held in postion thereagainst by retaining bars 37. The pedestal carriage 34 has a rotary shaft 40 carrying a pinion 42 meshing with the rack 32 whereby the pedestal carriage 34 is propelled backward or forward along the horizontal ways 28, the direction or rotation of the shaft 40 and pinion 42 being reversible for this purpose.

Rising from the base portion 36 of the pedestal carriage is a vertically-elongated pedestal 44 having thereon elongated vertical guideways 46 upon which a ram carriage 48 is vertically movable by means of an elevating screw shaft 50 rotatably mounted at its upper end in a bridge member 52 and rotated through conventional gearing (not shown) by an electric motor 54, which also is adapted through conventional gearing (not shown) to rotate the shaft 40. The ram carriage 48 is counterbalanced by a cable 56 running over a pulley 58 in a bracket 60 rising from the bridge member 52 and secured at one end to the ram carriage 48 and at its opposite end to a counterweight (not shown), within the pedestal 44. The motor 54 is mounted upon an elongated inverted cross-shaped hood or cover 62 which in turn is connected to one side of the ram carriage 48 and moved with it as a unit. The ram carriage 48 is equipped with a ram guideway 64 in which the ram 21 is reciprocably mounted for travel back and forth in a horizontal direction perpendicular to the direction of travel of the pedestal carriage 34 along its horizontal ways 28.

Secured to the ram carriage 48 is a bracket 66 to which is secured one end of a piston rod 68, the opposite end of which carries a piston head (not shown) reciprocably mounted in a double-acting hydraulic cylinder 70 connected to and movable with the ram 21. Hydraulic pressure fluid, such as oil under pressure from a conventional pump (not shown) is supplied through a suitable valve (also not shown) to either end of the hydraulic cylinder 70 to cause the ram 21 to reciprocate horizontally in the desired direction. This reciprocation, in the machine 20 shown in FIGURE 1, is subject to so-called hydraulic tracer control, and this in turn is brought about by the tracer device, generally designated 72, shown at the top of the ram carriage 48. The later is provided with horizontally-bored upstanding ears or bosses 74 in which a horizontal shaft 76 is reciprocably mounted. Secured to the shaft 76 are spaced attachment blocks 78 and 80 depending from and secured to a tracer slide 82 having at its opposite end a depending block 81.

Mounted on the tracer slide 82 and extending upwardly therefrom is a tracer support 84 carrying a dovetail rib 86 upon which a tracer head 88 is slidably mounted. The tracer head 88 carries a tracer shaft 90 equipped with a tracer rod 92 terminating in a tracer roller 94 which in turn engages a conventional template or pattern (not shown) intended to govern the travel of the tracer slide 82. By conventional mechanism common to so-called Kellering machines and known to those skilled in the machine tool art, the motions of the tracer element 94 against the pattern or template are transmitted to the ram 21 by controlling the supplying of hydraulic pressure fluid to the hydraulic cylinder 70 in such a manner as to cause the ram 21 to follow and reproduce the motion of the tracer element 94, this motion in turn being imparted to a milling cutter or other cutting tool mounted on the machining head 22 which in turn is mounted on the ram 21 as described below. The machine 20 is also provided with conventional manual control levers 98 and 100, a manual control wheel 102 and a manual control knob 104 for the various mechanisms contained in the ram carriage 48 for manually controlling it and the travel of the pedestal carriage 34 along the guideways 28.

In order to rotate the cutting tool or milling tool 96 in the machining head 24, there is rotatably mounted with the ram 22 a tool drive shaft 106 which on its rearward end has a gear 108 drivingly secured thereto and mounted in a housing 110 secured to the rearward end of the ram 21 so as to travel therewith. Rotatably mounted in the housing 110 on a hollow shaft 112 is a pinion 114 having a spline bore therethrough engaging a spline shaft 116 of corresponding cross-section, so that as the ram 21 and housing 110 travel back and forth under the action of the hydraulic cylinder 70 and piston rod 66, the pinion 114 travels back and forth along the spline shaft 116 while maintaining a splined driving connection therewith. The spline shaft 116 at its outer end is rotatably mounted as at 118 in the outer end of the hood or cover 62 and at its inner end is rotatably mounted within the ram carriage 48 and driven through conventional gearing from the shaft 120 of the electric motor 54.

Ram and machining head coupling construction

The ram 21 is in the form of an elongated hollow box of rectangular cross-section, preferably square, and constructed of steel or other suitable material having machined side surfaces 122 and a bore 124 of circular cross-section through the center thereof. The forward end of the ram 21 is provided with a nose portion 126 of hollow cylindrical shape having a cylindrical outer surface 130 meeting the rearward portion 132 thereof in a shouldered surface 134 (FIGURE 6). The nose portion 126 at its forward end is provided with a threaded counterbore 136 forming a continuation of the bore 124 and is also externally grooved as at 138 to provide a keyway in which key 140 is seated. The nose portion 126, with its key 140 and its cylindrical surface 130, serves to receive the machining head 22 (FIGURES 2, 3 and 4) and the other machining heads 23, 24 and 25 interchangeable therewith, as described below.

The drive shaft 106 (FIGURES 2 and 7) at its forward end is rotatably supported within the bore 124 of the ram 21 by spaced tapered roller bearing assemblies or sets 142 and 144, the former being held in position by an internally-threaded retaining ring 146 threaded upon the threaded portion 148 of the shaft 106. The roller bearing assembly 142 is spaced axially from the assembly 144 by a spacing sleeve 150 (FIGURE 2) which engages and separates the outer races thereof, all being mounted in the ram bore 124. The outer end of the ram drive shaft 106 is threaded as at 152 to receive an internally-threaded stepped inner retaining collar 154 which through the washer 156 engages the inner race of the forward roller bearing assembly 144, thereby urging the outer race thereof against the spacing sleeve 150.

The retaining collar 154 is grooved externally to hold a packing ring or lubricant seal 158 which has sealing engagement with the interior of an outer externally-threaded stepped retaining collar 160. The stepped portion of the latter interengages with the stepped portion of the former and the washer 156 to form a labyrinthine path impeding the escape of lubricant from the space 162 between the ram drive shaft 106 and the wall of the bore 124 within the ram 22 itself (FIGURE 2). The outer retaining collar 160 is threaded into a threaded counterbore 164 at the outer end of the ram bore 124, thereby engaging and holding the outer race of the tapered roller bearing assembly 144 in position against the spacing sleeve 150. The outer end 166 of the ram drive shaft 106 is provided with circumferentially-spaced axially-offset sockets or recesses 168 adapted to receive end or face drive keys 170 by which a separable driving connection is established between the ram 106 and the input shaft 172 of the quick-detachable machining head 22 (FIGURE 2) which is for brevity hereinafter referred to as the first machining head 22.

First machining head construction

The input shaft 172 of the first machining head 22 is provided with a central tapered reduced diameter portion 174 which extends into and has mating engagement with a correspondingly tapered socket 176 extending inwardly from the end 166 of the ram drive shaft 106. The input shaft 172 outwardly of the base of the tapered shank 174 is provided with sockets 178 aligned with the sockets 168 so as also to receive the drive keys 170. The input shaft 172 immediately adjacent the shouldered portion 180 containing the drive key sockets 178 is threaded as at 182 to receive a threaded retaining ring 184 which engages the inner race of an antifriction bearing assembly 186 mounted upon a shaft portion 188, the outer race thereof being mounted in a shouldered bore 190 in the reduced diameter end wall 192 of an approximately cylindrical mounting housing, generally designated 194, which is common to all of the machining heads 22, 23, 24 and 25. An annular closure disc 196 is bolted or otherwise secured to the external side of the reduced diameter portion 192 radially outward from the shaft portion 180 and is internally grooved to receive an annular packing or seal 198.

In order to establish a separable indexed connection between the mounting housing 194 and the cylindrical nose portion 126 of the ram 21, the mounting housing 194 is provided with an internal tapered or conical bore 200 (FIGURE 2) extending and converging inwardly from a threaded counterbore 202 at the end 204 thereof to an inner bore 206 slidably receiving an internally-threaded abutment ring 205 threaded upon the correspondingly threaded end of the cylindrical nose portion 126 of the ram 21. Mating with and snugly engaging the conical bore 200 is the correspondingly-shaped external conical surface 208 of an externally-tapered coupling sleeve or ring 210 having an internal cylindrical surface 212 mating with the external cylindrical surface 130 of the nose portion 126 of the ram 21. The coupling sleeve 210 is provided with an axially-directed keyway 214 (FIGURES 2 and 7) extending from end to end thereof and slidably receiving the key 140 seated in the keyway 138 in the ram nose portion 126. The tapered portion 174 of the input shaft 172 and the tapered socket 176 are grooved to receive a key 216 (FIGURE 7). An externally-threaded ring or nut 218 is rotatably mounted in a rabbet 219 at the outer end of the coupling sleeve 210 and threaded into the threaded counterbore 202 at the entrance to the conical bore 200 of the mounting housing 194 (FIGURE 2). The outer end of the nut 218 abuttingly engages the corner shoulder surfaces 134 (FIGURE 6) between the portions of square and circular cross-section 122 and 130 respectively. In order to facilitate rotation of the operating nut or clamping ring 218, the latter is provided with end recesses 220 adapted to be engaged by a conventional spanner or wrench.

The mounting housing 194 is provided with an external flange 222 (FIGURE 2) by which it is bolted as at 224 to the casing 226 of the machining head 22, or to any one of the casings of the machine heads 23 (FIGURES 8 and 9), 24 (FIGURES 10 and 11), or 25 (FIGURES 12 and 13), as described in more detail below in connection with the detailed descriptions of FIGURES 8 to 13 inclusive.

The input shaft 172 immediately beyond the enlarged diameter portion 188 is provided with a bevel gear 228 (FIGURE 2) and beyond the latter is provided with a shaft extension 230 having a reduced diameter portion 232 journaled in an anti-friction bearing assembly 234 mounted in a bore 236 in the casing 226 and held in position by a retaining plate 238 bolted thereto. Meshing with the bevel gear 228 is a bevel pinion 240 keyed to the reduced diameter portion 242 of a shaft 244 which is rotatably supported by a pair of tapered roller bearing assemblies 246 and 248 mounted respectively in stepped bores 250 and 252 in plates 254 and 256 bolted to the casing 226. The shaft 244 at its upper end is threaded to receive a retaining collar 258 and covered by an access plate 260 bolted to the cover plate 256. Keyed to the shaft 244 is a gear 262 which in turn meshes with a gear 264 (FIGURES 3 and 4) keyed or otherwise secured to the shaft 266. The latter is mounted in an upstanding tubular boss 268 by means of a pair of tapered roller bearing assemblies 270 and 272, and its upper end is threaded to receive a retaining collar 274 and covered by an access plate 276.

The gear 264 operates as an idler gear and meshes with a gear 278 keyed or otherwise secured to a cutter shaft 280 rotatably supported in tapered roller bearing assemblies 282 and 284 in the casing 226 and cover plate 256 and threaded at its upper end to receive a retaining collar 286 covered by the cover plate 288. The lower end of the cutter shaft 280 is enlarged as at 290 for the attachment of a cutter 292 which is drivingly connected thereto by a key 294, an access plate 296 being bolted to the casing 226 and bored for the passage of the shaft enlargement 290. The arrangement of parts (FIGURE 2) is preferably such that the medial plane of the cutter 292 is centered on the axis of rotation of the input shaft 172 of the first machining head 22 and therefore on the axis of the drive shaft 106, so that it remains on this axis when the machining head 22 is swung through any angle around the axis of rotation of the input shaft 172 as an axis of swing.

*Second machining head construction*

The second machining head 23 (FIGURES 8 and 9) is interchangeable with and of somewhat similar construction to the first machining head 22 but is simpler in arrangement in that it has a cutter 300, the medial plane of which is not required to be centered upon the axis of the drive shaft 106 of the ram 21. The mounting housing 302 of the second machining head 23 is essentially the same as the mounting housing 194 of the first machining head 22, hence similar parts are designated with the same reference numerals, with the exception of the fact that the anti-friction bearing assembly 186 of the mounting housing 194 has been replaced by a pair of tapered roller bearing assemblies 304 mounted upon the enlarged shaft portion 188 adjacent the bevel gear 228.

In the second machining head 23, however, the input shaft 172 lacks the extension 230, reduced diameter portion 232 and anti-friction bearing assembly 234, and instead meshes directly with a bevel pinion 306 keyed to a cutter shaft 308. The cutter shaft 308 is supported at its opposite ends in tapered roller bearing assemblies 310 and 312 respectively mounted in the casing 314 and insert plate 316 bolted into the opening 318 thereof. The shaft 308 near its lower end has a tapered socket 320 and a longitudinal bore 322 extending thereto from the upper end of the shaft 308 and containing a rod 324 with a squared upper end 326 for the application of a wrench and rotatably mounted in a threaded plug 328 threaded into a threaded counterbore 330 in the upper end of the shaft 308. The lower end of the rod 324 has threads thereon and is threaded into a correspondingly threaded socket 332 (FIGURE 8) in the tapered shank 334 of the cutter 300. The shaft 308 has stepped enlargements 336 and 338 at its lower end. An annular cover plate 340 is bolted to the insert plate 316 and surrounds the shaft enlargement 338 to prevent the entrance of foreign matter.

*Third machining head construction*

The third machining head 24 (FIGURES 10 and 11) is also interchangeable with the first and second machining heads 22 and 23 and for that purpose has a somewhat similar coupling arrangement with its mounting housing 342, similar parts to the mounting housing 194 of the machining head 22 being designated with the same reference numerals. In FIGURES 10 and 11, however, the mounting housing 342 is also the main housing of the machining head 24, and the input shaft 344 is of somewhat different construction from the input shaft 172 of the first machining head 22, even though it has a tapered shank 346 similarly fitting the tapered socket 176 in the end of the drive shaft 106 of the ram 21. The input shaft 344 is rotatably supported in a pair of tapered roller bearing assemblies 348 and 350 respectively disposed on opposite sides of a spur gear 352. The bearing assembly 348 is mounted in a shouldered bore 354 in the mounting housing 342 and has an annular closure plate 356 bolted thereto for protection of the bearing assembly 348. The bearing assembly 350, on the other hand, is mounted in a bore 358 in an end plate 360 of the mounting housing 342 and similarly covered by an annular closure plate 362, also bolted thereto.

The spur gear 352 meshes with an idler pinion 364 supported on a pair of tapered roller bearing assemblies 366, the inner races of which are mounted upon a stationary shaft 368, one end of which is mounted in a socket 370 in the mounting housing 342, whereas its opposite end is mounted in a bore 372 in the end plate 360. Meshing with the pinion 364 is a gear 374 which is keyed or otherwise drivingly secured to a cutter shaft 376, the rearward end of which is rotatably supported in tapered roller bearing assemblies 378 (FIGURE 10) held in place by a retaining ring or nut 380 threaded thereon and covered by an access plate 382. The opposite end of the cutter shaft 376 is rotatably supported by a roller bearing assembly 384 also mounted in the mounting housing 342 and also having an access plate 386 bolted thereto. A retaining ring or nut 386 holds the gear 374 in its position on the shaft 376, which is hollow and has an axial bore 388 therethrough terminating in a tapered socket 390. Mounted in the bore 388 is a clamping rod 392, the outer end of which carries a head 394 for a wrench and the inner end of which is threaded into a correspondingly-threaded socket 396 of the tapered shank 398 of a rotary cutter 400.

*Fourth machining head construction*

The fourth machining head 25 (FIGURES 12 and 13) is also interchangeable with the first, second and third machining heads 22, 23 and 24, and for that purpose has a mounting housing 402 of similar construction to the mounting head 302 of the machining head 23, together with a similar input shaft 172 similarly rotatably supported by similar tapered roller bearing assemblies 304 on the enlarged diameter portion 188 thereof. Accordingly, similar parts are designated with the same previously-used reference numerals. The bevel pinion 228 on the inner end of the input shaft 172, however, meshes with a bevel pinion 404 (FIGURE 12) keyed to a countershaft 406, the lower and upper ends of which are rotatably supported in tapered roller bearing assemblies 408 and 410 respectively mounted in bores 412 and 414 in the casing 416 of the fourth machining head 25. The upper end of the shaft 406 is threaded to receive a retaining nut 418 and covered by an access plate 420 bolted thereto.

The lower side 422 of the housing 416 is flanged and is machined with a recessed outer surface 424 having an annular shoulder 426 between it and the peripheral surface 428, which is also accurately machined. Rotatably engaging the outer and inner surfaces 428 and 424 (FIGURE 12) are the stepped outer and inner surfaces 430 and 432 of the upper wall 434 of a rotary auxiliary casing 436 separated from one another by an annular shoulder 438 which engages the shoulder 426. The shoulders 438 and 426 are coaxial with the axis of rotation of the countershaft 406, as is also an annular T-slot 440 engaged by the heads of clamping bolts 442 (FIGURE 13) passing through holes 444 in the flange of the lower side 422 of the casing 416 and carrying nuts 446 by which the bolts 442 may be tightened in order to clamp the rotary auxiliary casing 436 to the casing 416 in any position of adjustment relatively thereto.

The rotary auxiliary casing 436 has an approximately semi-cylindrical portion 448 extending downward from the upper wall 434 thereof and bored at one end to receive a tapered roller bearing assembly 450 (FIGURE 12) which rotatably supports the rearward end of a cutter shaft 452. Keyed to the lower end of the countershaft 406 within the rotary auxiliary casing 436 is a bevel gear 454 inserted therein through a circular opening 456 in the upper wall 434 of the rotary auxiliary casing 436. Meshing with the bevel gear 454 is a bevel gear 458 keyed to the cutter shaft 452, the forward end of which is rotatably supported by a tapered roller bearing assembly 460 mounted in a bore 462 in an end plate 464 which in turn is bolted into the entrance opening 466 of the rotary auxiliary housing 436. The cutter shaft 452 has step portions 468 and 470 for receiving and abutting the inner end of the tapered roller bearing assembly 450, and the step portion 470 is surrounded by an annular recess plate 472 bolted to the end plate 464.

The cutter shaft 452 is provided with a longitudinal bore 474 therethrough terminating in a tapered socket 476. The bore 474 receives a clamping rod 478, the rearward end of which is squared for receiving a suitable wrench (not shown) and also threaded as at 482 for receiving a nut 484, the cylindrical portion 486 of which extends into an opening 488 in a rearward end plate 490 which is bolted to the opposite end of the housing 436 from the end plate 464. Inside the end plate 490, the cutter shaft 452 is threaded as at 492 to receive a retaining nut 494 for the inner race of the tapered roller bearing assembly 450.

The inner or forward end of the rod 478 is threaded as at 496 and threadedly engages a correspondingly-threaded socket 498 in the tapered shank 500 of a cutter 502. The cutter 502 is also connected to the step portion 470 of the cutter shaft 452 by diametrically opposite driving keys 504 seated in radial grooves 506 therein and engaging corresponding radial grooves 508 in the cutter 502.

*Operation*

In the operation of the invention, let it be assumed, for example, that the first machining head 22 is mounted as shown in FIGURES 1 to 4 inclusive on the horizontal ram 21 of the milling machine 20 and that a portion of a workpiece (not shown), such as a large die, is to be internally milled at a not easily accessible location which is disposed at a considerable distance from an entrance opening. Accordingly, a suitable milling cutter 292 is mounted on the shaft 280 and keyed thereto as by the driving key 294. The elevating screw shaft 50 is then operated to raise or lower the ram carriage 48 until the machining head 22 is positioned on the proper level to enter the access opening in the die or other workpiece to be machined, where the hydraulic cylinder 70 is supplied with pressure fluid to advance the ram 21 and the machining head 22 to the cutting location on or in the workpiece. If the machining head 22 is not already properly oriented with respect to the ram 21, this is done by rotating the operating ring or nut 218 (FIGURE 2). The latter, being trapped between the shouldered surface 134 and the rabbeted portion 219 of the coupling sleeve 210, cannot move axially, hence its rotation relatively to the threaded counterbore 202 in the mounting housing 194 moves the latter to the right, disengaging its conical bore 200 from the external conical surface 208 of the coupling sleeve 210 and uncoupling the machining head 22 from the ram 21 to the correct and desired angular position relatively to the horizontal or vertical until the cutter 292 is positioned at the desired orientation. The ring or nut 218 is then retightened to reclamp the casing 226 to the ram 21.

The motor 54 is then started in operation so as to rotate the splined shaft 116. This rotary motion is transmitted through the splined pinion 114 to the gear 108 meshing with it, so that the driving connection between the shaft 108 and the shaft 116 is maintained in all positions of reciprocation of the ram 21. The rotation of the shaft 106 at its outer or forward end is conveyed to the input shaft 172 of the first machining head 22 through the engagement of the tapered portion 174 thereof with the tapered socket 176 of the shaft 106, this rotation being conveyed to the cutter 292 by way of the bevel gears 228 and 240, the shaft 244, the gears 262, 264 and 278 (FIGURES 3 and 4) and the cutter shaft 280. Cutting is then carried out by the cutter 292, and the ram 21 advanced or retracted or the carriage 48 raised or lowered or the entire assembly moved back and forth by moving the pedestal carriage 34 along the ways 28 of the base 26 by means of the pinion 42 and rack 32 (FIGURE 1) until the cutter 292 has performed all of the cutting action of which it is capable. If a different type of machining head is now needed, one of the cutting heads 23, 24 or 25 may be substituted therefor, after loosening its clamping ring 218 to permit this. The machining head 22 is then removed by sliding its mounting housing 194, together with its split coupling ring 210 and threaded clamping ring 218 off the nose portion 126 of the ram 21 and the next machining head 23, 24 and 25 installed by reversing the foregoing procedure.

The second machining head 23, when thus installed upon the ram 21, enables the machining of surfaces or portions which are offset laterally from but parallel to the axis of the ram 21, by means of the rotary cutter 300 (FIGURES 8 and 9). The third machining head 24, on the other hand, permits the machining of surfaces or portions which are offset laterally from the axis of the ram 21 but perpendicular thereto by means of the rotary cutter 400. The fourth machining head 25 will do the same work as the third machining head 24, and in addition it may be used to machine oblique or skew surfaces by loosening the nuts 446 of the clamping bolts 442, rotating the rotary auxiliary casing 436 until the cutter shaft 452 and cutter 502 are presented at the proper angle to the work. The clamping nuts 446 are then retightened to reclamp the auxiliary casing to the casing 416.

What I claim is:

1. A quick detachable interchangeable mounting arrangement for interchangeably and removably securing cutting heads to a travelling-ram milling machine, said arrangement comprising a hollow ram having a main portion and a substantially cylindrical end portion with a stop projection thereon, a drive shaft rotatably mounted in said ram, an annular tapered coupling member having a bore therethrough telescopingly receiving said cylindrical end portion and having a substantially conical external surface substantially coaxial with said bore and drive shaft, means for connecting said coupling member to said cylindrical end portion for relative longitudinal sliding motion therebetween while preventing relative rotation therebetween, means on said end portion for anchoring said coupling member against said stop projection, a hollow cutting head mounting housing having an internal substantially conical bore matingly engaging said conical external surface of said coupling member, means for urging said mounting housing axially into wedging engagement with said coupling member, said mounting housing having a cutting head connection portion thereon and a bearing mounted therein coaxial with said cylindrical end portion, a driven shaft rotatably mounted in said bearing, and means drivingly coupling said drive shaft to said driven shaft.

2. A quick-detachable interchangeable mounting arrangement, according to claim 1, wherein said mounting housing has an internally-threaded bore therein adjacent the end of said coupling member, wherein said end of said coupling member has an annular abutment surface thereon, and wherein said urging means includes an annular externally-threaded member threadedly engaging said threaded bore and abuttingly engaging said abutment surface.

3. A quick-detachable interchangeable mounting arrangement, according to claim 2, wherein said end of said coupling member has an annular external recess and wherein said annular member is rotatably mounted in said recess.

4. A quick-detachable interchangeable mounting arrangement, according to claim 1, wherein the end of said ram end portion is externally threaded and wherein said stop projection includes an annular nut threaded upon said threaded ram end portion.

5. A quick-detachable interchangeable mounting arrangement, according to claim 4, wherein said internal conical bore has a bore extension of substantially circular cross-section and wherein said annular nut has an external surface of substantially circular cross-section matingly engaging said bore extension.

References Cited in the file of this patent

UNITED STATES PATENTS

| | | |
|---|---|---|
| 736,108 | Jones | Aug. 11, 1903 |
| 1,028,728 | Hughes | June 4, 1912 |
| 1,304,126 | Venable | May 20, 1919 |
| 1,542,266 | Palmer et al. | June 16, 1925 |
| 1,999,488 | Swisher et al. | Apr. 30, 1935 |
| 2,227,410 | Johnson | Dec. 31, 1940 |
| 2,722,161 | Berthiez | Nov. 1, 1955 |

FOREIGN PATENTS

| | | |
|---|---|---|
| 252,173 | Switzerland | Oct. 1, 1948 |
| 686,281 | Great Britain | Jan. 21, 1953 |
| 922,557 | France | Feb. 3, 1947 |